US012759663B2

(12) United States Patent
Yao et al.

(10) Patent No.: US 12,759,663 B2
(45) Date of Patent: Oct. 13, 2026

(54) ELECTRIC SCOOTER

(71) Applicant: NANJING SUSA INTELLIGENT TECHNOLOGY CO., LTD., Nanjing (CN)

(72) Inventors: Yuman Yao, Nanjing (CN); Jinhua Zhou, Nanjing (CN); Rui Yang, Nanjing (CN)

(73) Assignee: NANJING SUSA INTELLIGENT TECHNOLOGY CO., LTD., Nanjing (CN)

(*) Notice: Subject to any disclaimer, the term of this patent is extended or adjusted under 35 U.S.C. 154(b) by 391 days.

(21) Appl. No.: 18/503,200

(22) Filed: Nov. 7, 2023

(65) Prior Publication Data

US 2024/0116592 A1 Apr. 11, 2024

Related U.S. Application Data

(63) Continuation of application No. PCT/CN2023/077700, filed on Feb. 22, 2023.

(30) Foreign Application Priority Data

| | | |
|---|---|---|
| Oct. 9, 2022 | (CN) | 202222675507.X |
| Feb. 3, 2023 | (CN) | 202320140798.4 |
| Feb. 3, 2023 | (CN) | 202320153984.1 |

(51) Int. Cl.
*B62K 3/00* (2006.01)
*B62K 13/00* (2006.01)

(52) U.S. Cl.
CPC .............. *B62K 3/002* (2013.01); *B62K 13/00* (2013.01); *B62K 2202/00* (2013.01); *B62K 2204/00* (2013.01)

(58) Field of Classification Search
CPC ................ B62K 3/002; B62K 2202/00; B62K 2204/00; B62K 13/00
See application file for complete search history.

(56) References Cited

U.S. PATENT DOCUMENTS 6,431,301 B1 * 8/2002 Forbes .................. B62M 27/02 180/185
6,474,660 B1 * 11/2002 Warren ................. B62K 13/00 280/14.25

(Continued)

FOREIGN PATENT DOCUMENTS

CN 112793678 A 5/2021
CN 214451404 U * 10/2021

(Continued)

OTHER PUBLICATIONS

International Search Report of PCT Patent Application No. PCT/CN2023/077700 issued on Jun. 25, 2023.

*Primary Examiner* — John D Walters
(74) *Attorney, Agent, or Firm* — Andrew C. Cheng

(57) ABSTRACT

The invention relates to the field of scooters, in particular to an electric scooter. The electric scooter comprises a scooter body having a top surface allowing a driver to stand thereon, a handlebar is arranged on a front portion of the scooter body, a rear mounting structure is arranged at the bottom of a rear portion of the scooter body, which allows a user to select either one of two rear members, which are a driving wheel and a driving caterpillar track, as a rear landing member to be detachably mounted on the rear mounting structure. The electric scooter can adapt to different landing members and can easily pass through complex roads such as muddy roads, snowy roads or desert roads using different landing members, thus being suitable for a wide range of scenarios.

9 Claims, 16 Drawing Sheets

(56) References Cited

U.S. PATENT DOCUMENTS

| | | | | |
|---|---|---|---|---|
| 6,983,941 B2 * | 1/2006 | Moscaret | ................ | B62B 17/08 280/14.28 |
| 7,438,297 B2 * | 10/2008 | Fernandez | ............. | B62K 13/00 280/220 |

FOREIGN PATENT DOCUMENTS

| | | | | |
|---|---|---|---|---|
| CN | 215361723 | U | * | 12/2021 |
| CN | 217496401 | U | | 9/2022 |
| CN | 218258544 | U | | 1/2023 |

* cited by examiner

ELECTRIC SCOOTER

FIELD

The invention relates to the field of scooters, in particular to an electric scooter.

BACKGROUND

Electric scooters are immensely popular because of their convenience and flexibility, and are the preferred transportation tool for people's daily outings and commuting. The electric scooter has a plate-like body, a front driven wheel is arranged on a front side of the bottom of the body, and a rear driving wheel is arranged on a rear side of the bottom of the body. A steering stem is arranged on a front portion of the body, and a handlebar to be controlled by drivers is arranged on an upper portion of the steering stem; a lower portion of the steering stem is connected to front mounting plates and is able to drive the front mounting plates and the front driven wheel mounted on the front mounting plates to rotate synchronously around the axis of the steering stem. A driver stands on the body of the electric scooter, and holds and operates the handlebar to control the steering stem to rotate together with the front driven wheel to control the electric scooter to make a turn. However, such electric scooters are merely suitable for flat roads and applicable in limited scenarios; and when such electric scooters are driven on complex roads such as muddy roads, snowy roads or desert roads, the rear driving wheel is easy to slip, making driving difficult.

SUMMARY

The technical issue to be settled by the invention is to provide an electric scooter, which can adapt to different landing members and can easily pass through complex roads such as muddy roads, snowy roads or desert roads using different landing members, thus being suitable for a wide range of scenarios.

In order to solve the above technical issue, the present invention provides an electric scooter, comprising a scooter body, the scooter body having a top surface allowing a driver to stand thereon, and a handlebar being arranged on a front portion of the scooter body, wherein a rear mounting structure is arranged at a bottom of a rear portion of the scooter body, which allows a user to select either one of two rear members, which are a driving wheel and a driving caterpillar track, as a rear landing member to be detachably mounted on the rear mounting structure.

A front mounting structure is arranged at a bottom of the front portion of the scooter body, which allows the user to select either one of two front members, which are a driven wheel and a landing board, as a front landing member to be detachably mounted on the front mounting structure.

The front mounting structure comprises front mounting plates extending forward from the front portion of the scooter body, and front mounting grooves are formed in the front mounting plates to allow the front landing member to be clamped and mounted therein; and the rear mounting structure comprises rear mounting plates extending backward from the rear portion of the scooter body, and rear mounting grooves are formed in the rear mounting plates to allow the rear landing member to be clamped and mounted therein.

The electric scooter comprises the driving wheel and/or the driving caterpillar track, the two rear members are provided with rear mounting blocks and are able to rotate around the corresponding rear mounting blocks, and each said rear member is clamped into the rear mounting grooves by means of the rear mounting block.

The electric scooter is provided with a recognizer capable of recognizing the type of the rear landing member mounted on the rear mounting structure, and comprises a controller configured to control the rear landing member and connected to the recognizer.

The recognizer comprises a pattern recognition line, at least one said rear member is provided with a pattern butting line capable of reflecting the type of said rear member, and after said rear member provided with the pattern butting line is mounted on the rear mounting structure, the pattern butting line is connected to the pattern recognition line.

The two rear members are both provided with pattern butting lines reflecting the type of the rear members.

The two rear members are provided with taillights, the taillights are provided with taillight butting lines to be connected to the controller, and the taillight butting lines are integrated with the pattern butting line; the controller is connected with a taillight connecting line, and the taillight connecting line is integrated with the pattern recognition line; start ends of the taillight butting lines and the pattern butting line which are integrated together share a same butt joint, and tail ends of the taillight connecting line and the pattern recognition line which are integrated together share a butt joint, and after the rear members are mounted on the rear mounting structure, the two butt joints are joined together to connect the taillight butting lines to the taillight connecting line and connect the pattern butting line to the pattern recognition line.

And/or the two rear members are provided with driving motors, the driving motors are provided with motor butting lines to be connected to the controller, and the motor butting lines are integrated with the pattern butting line; the controller is connected with a motor connecting line, and the motor connecting line is integrated with the pattern recognition line.

Start ends of the motor butting lines and the pattern butting line which are integrated together share a same butt joint, and tail ends of the motor connecting line and the pattern recognition line which are integrated together share a butt joint, and after the rear members are mounted on the rear mounting structure, the two butt joints are joined together to connect the motor butting lines to the motor connecting line and connect the pattern butting line to the pattern recognition line.

The driving caterpillar track comprises a circular caterpillar track body, a front driving pulley and a rear driven pulley are arranged in the caterpillar track body, and a diameter of the driven pulley is less than that of the driving pulley.

The diameter of the driving pulley is 200 mm-260 mm, and/or the diameter of the driven pulley is 100 mm-150 mm; and a ratio of the diameter of the driving pulley to the diameter of the driven pulley is 1.5-2.5, and an axial distance is 300 mm-350 mm.

Beneficial effects: a rear mounting structure is arranged at the bottom of a rear portion of a scooter body of the electric scooter of the present invention, and users can drive the electric scooter on different roads by mounting different landing members on the rear mounting structure. Users can mount a driving wheel on the rear mounting structure of the scooter body to drive the electric scooter on flat roads; and in order to drive the electric scooter on muddy, snowy or desert roads, users can detach the driving wheel and mount a driving caterpillar track, which is unlikely to slip, on the rear mounting structure of the scooter body. As can be seen, the electric scooter can adapt to different landing members and can easily pass through complex roads such as muddy roads, snowy roads or desert roads using different landing members, thus being suitable for a wide range of scenarios.

REFERENCE NUMERALS

1*a*, scooter; 1*b*, scooter; 1*c*, scooter; 11, scooter body; 12, steering stem; 13, handlebar; 14, front mounting plate; 141, front mounting groove; 15, rear mounting plate; 151, rear mounting groove; 2, driven wheel; 21, driven outer wheel; 3, driving wheel; 31, driving motor; 311, motor butting line of driving wheel; 32, first male butt joint of driving wheel; 33, driving wheel taillight; 331, taillight butting line of driving wheel; 34, second male butt joint of driving wheel; 35, pattern butting line of driving wheel; 36, driving outer wheel; 41, motor connecting line; 42, first female butt joint; 43, taillight connecting line; 44, second female butt joint; 45, pattern recognition line; 5*a*, front mounting block of driven wheel; 51*a*, front shaft of driven wheel; 5*b*, front mounting block of landing board; 51*b*, front shaft of landing board; 6, driving caterpillar track; 61, driving motor; 611, motor butting line of driving caterpillar track; 62, first male butt joint of driving caterpillar track; 63, caterpillar track taillight; 631, taillight butting line of driving caterpillar track; 64, second male butt joint of driving caterpillar track; 65, pattern butting line of driving caterpillar track; 66, caterpillar track body; 67, driving pulley; 68, driven pulley; 7*a*, rear mounting block of driven wheel; 71*a*, rear shaft of driven wheel; 7*b*, rear mounting block of driving caterpillar track; 71*b*, rear shaft of driving caterpillar track; 8, landing board; 81, body; Z, axial distance.

DESCRIPTION OF THE EMBODIMENTS

The invention will be described in further detail below in conjunction with specific embodiments.

Figure 1:
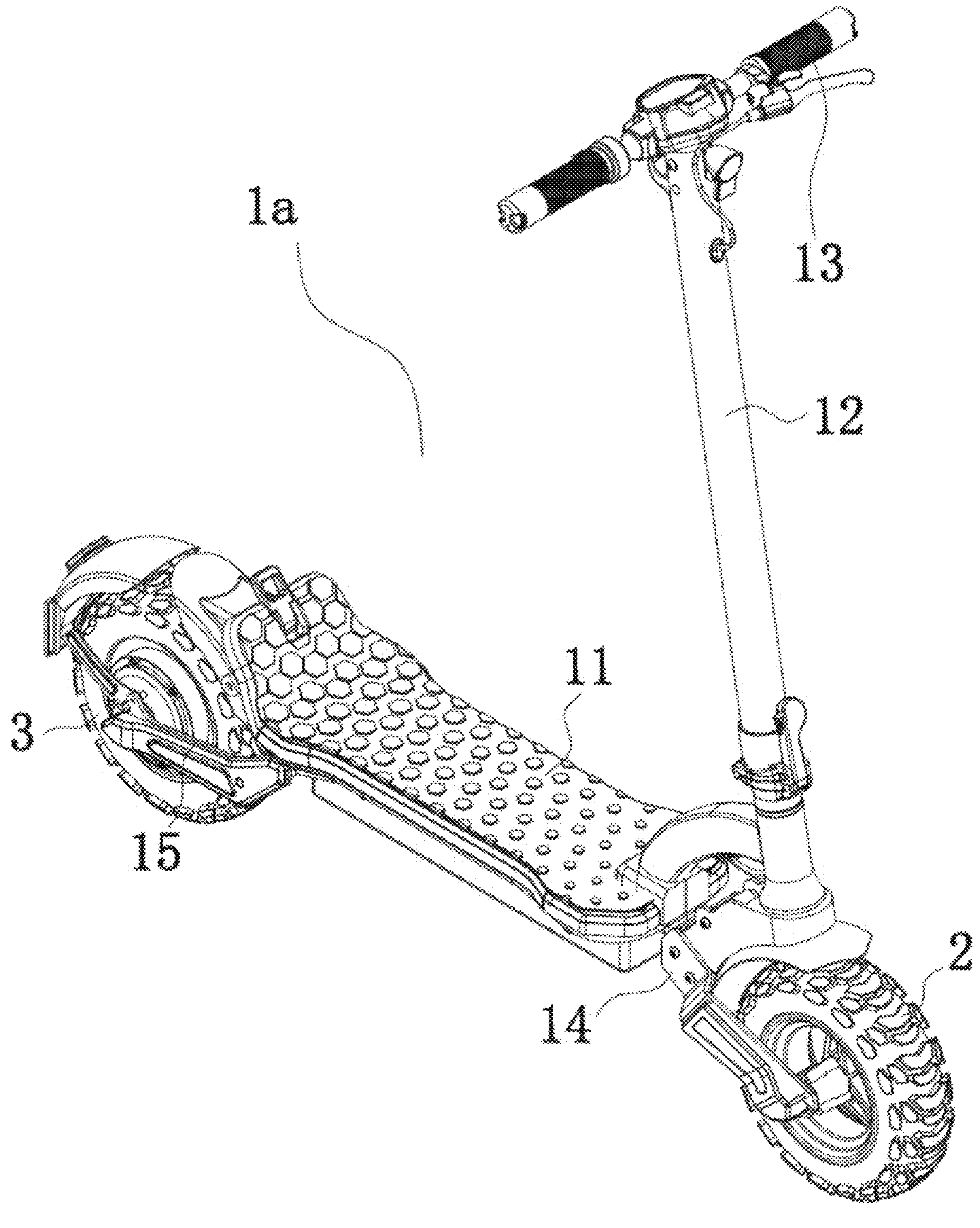
FIG. 1 is a schematic structural view of a scooter (with a driven wheel and a driving wheel).
Figure 7:
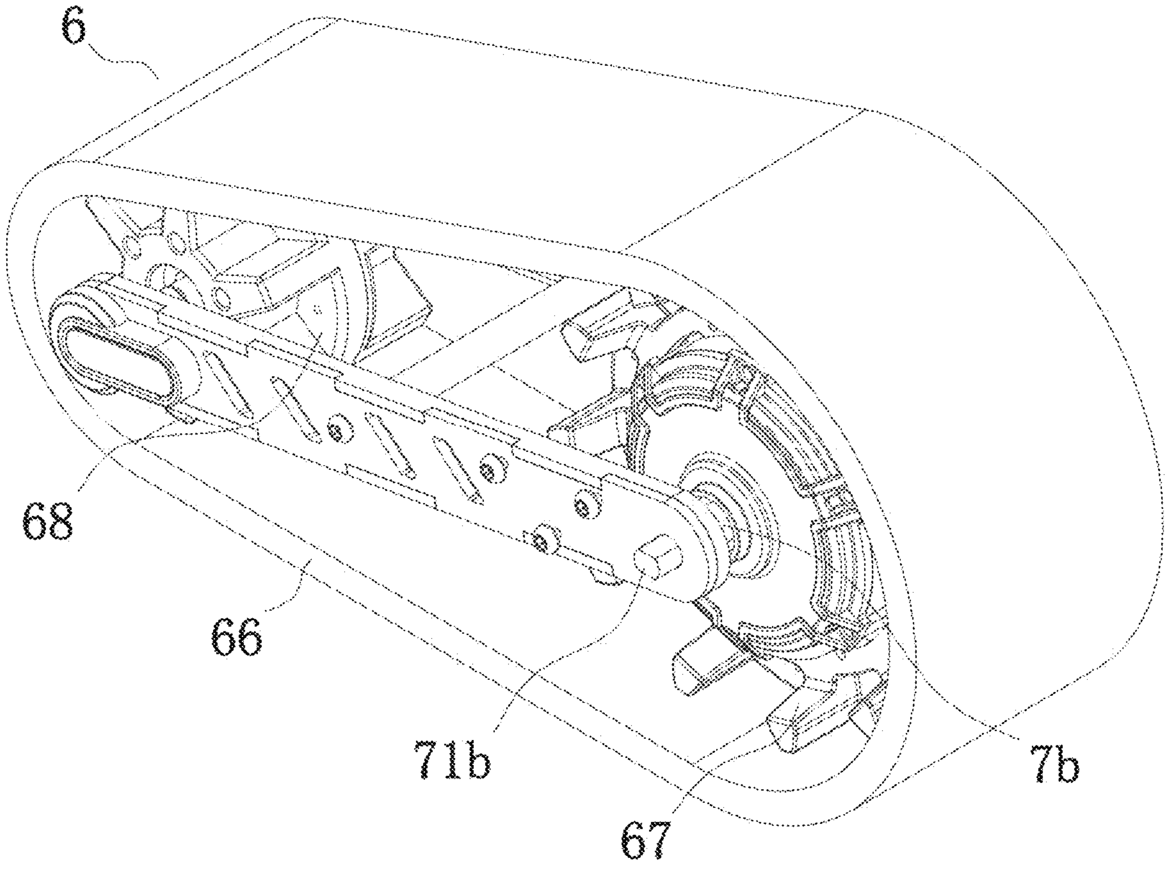
FIG. 7 is a schematic structural view of a driving caterpillar track (with a taillight, lines on the outer surface of a caterpillar track body, a butting line, and a male butt joint removed).
Figure 9:
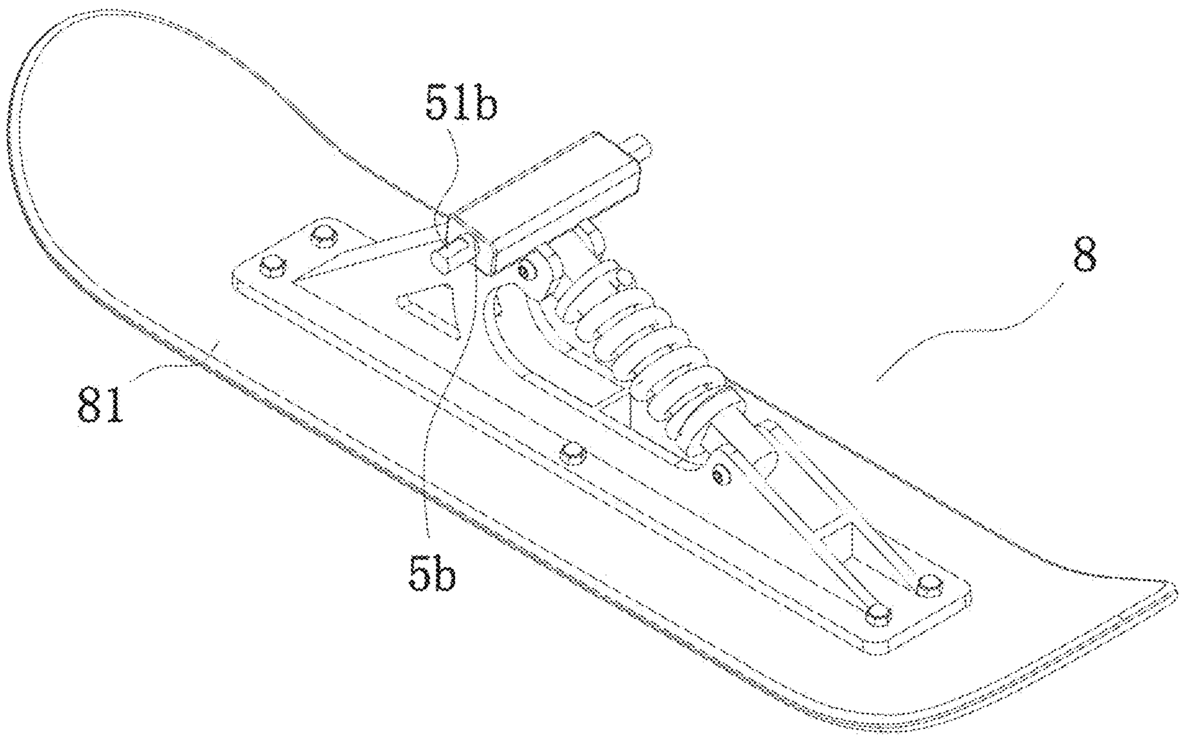
FIG. 9 is a schematic structural view of a landing board.
Figure 10:
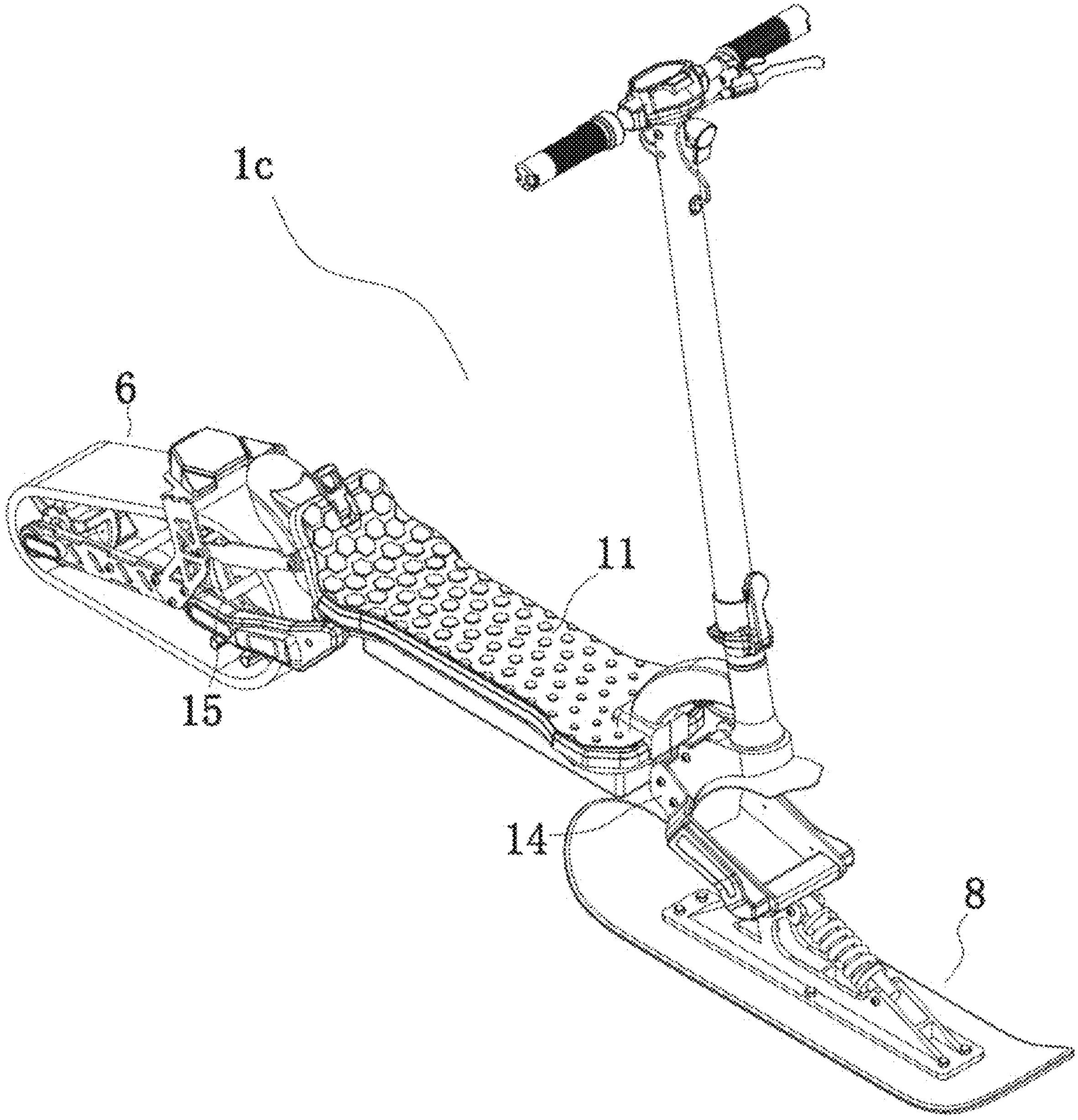
FIG. 10 is a schematic structural view of a scooter (with the landing board and the driving caterpillar track).

Referring to FIG. 1, a scooter 1*a* comprises a scooter body 11, wherein the scooter body 11 has a top surface allowing a driver to stand thereon, a controller (not shown) with preset control programs and a power supply (not shown) electrically connected to the controller are mounted in the scooter body 11, and the power supply supplies power to electric components through the controller. A steering stem 12 extends upward from a front portion of the scooter body 11, and a handlebar 13 to be held by the driver to control the steering stem 12 is arranged at the top of the steering stem 12. A driven wheel 2 and a driving wheel 3 are detachably mounted on a front portion and a rear portion of the bottom of the scooter body 11, respectively. The scooter 1*a* with the driven wheel 2 and the driving wheel 3 can be driven on flat roads quickly. When users want to drive the scooter 1*a* on complex roads such as muddy roads, snowy roads or desert roads, the driven wheel 2 and the driving wheel 3 need to be detached from the scooter 1*a* and replaced with a landing board 8 (see FIG. 9) and a driving caterpillar track 6 (see FIG. 7) respectively, and the scooter 1*c* provided with the landing board 8 and the driving caterpillar track 6, as shown in FIG. 10, can be quickly driven on complex roads without slipping. The specific structure of the scooter is described in detail below.

Figure 2:
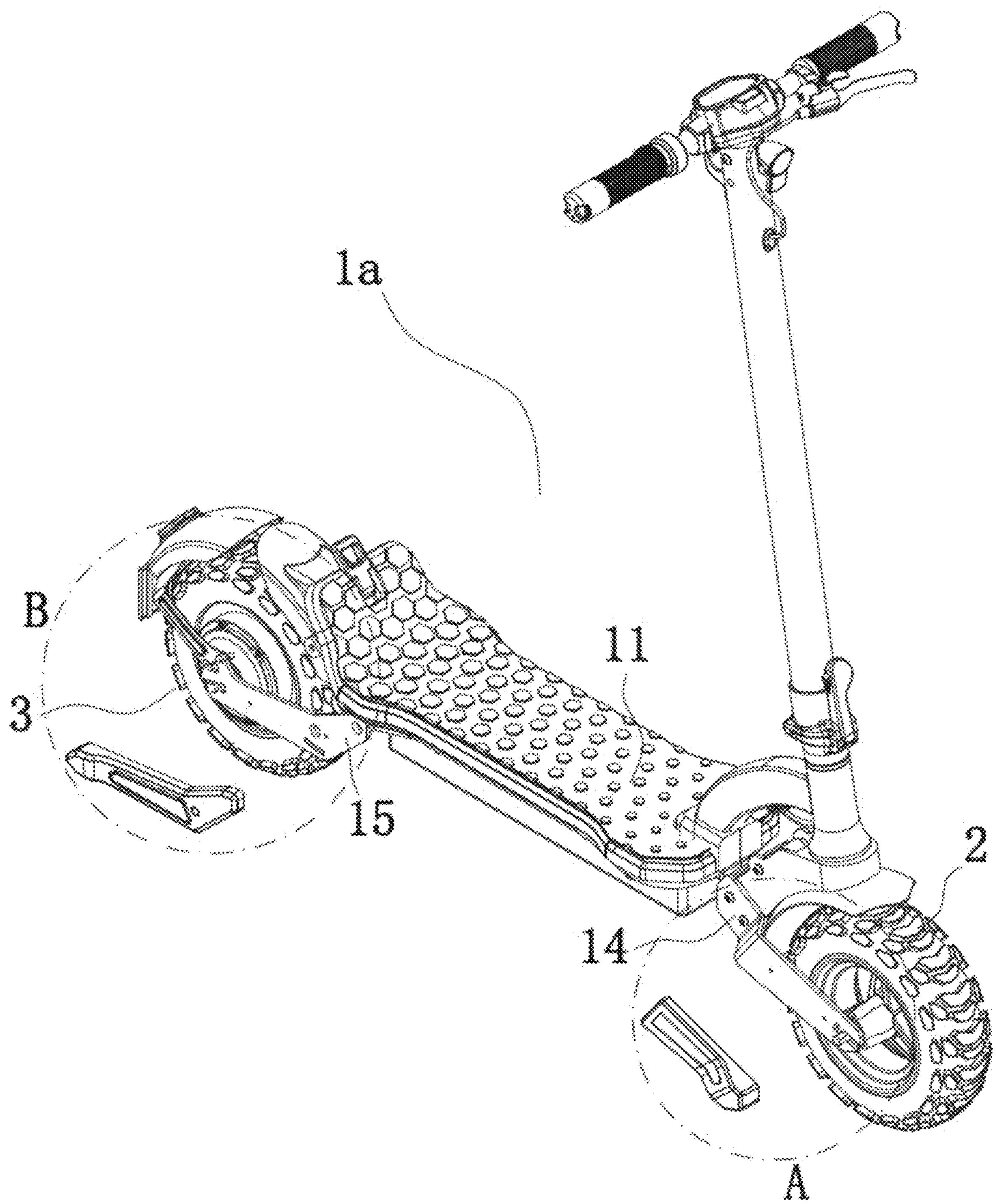
FIG. 2 is a partially exploded view of the scooter (with the driven wheel and the driving wheel).
Figure 3:
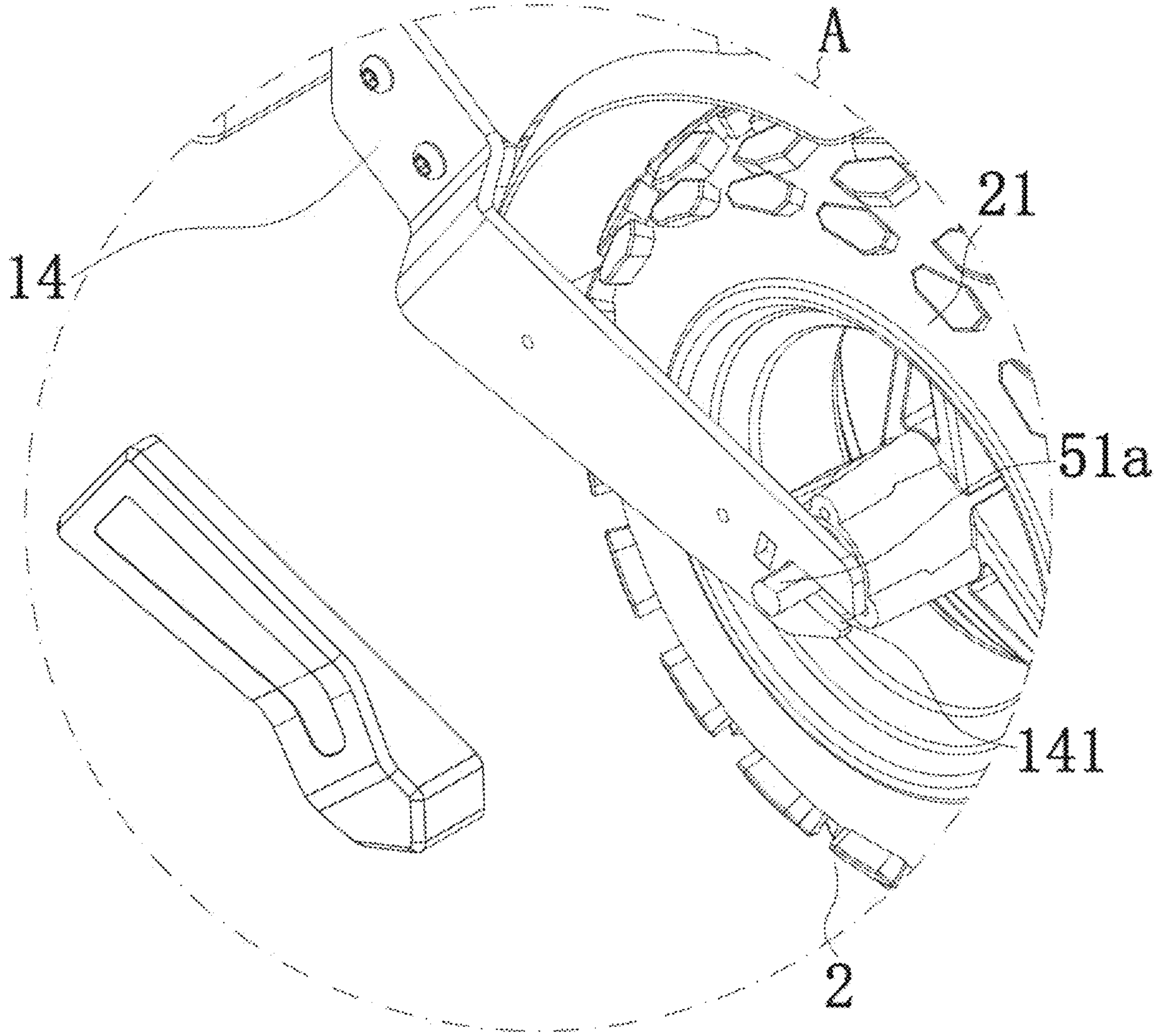
FIG. 3 is an enlarged view of portion A in FIG. 2.
Figure 4:
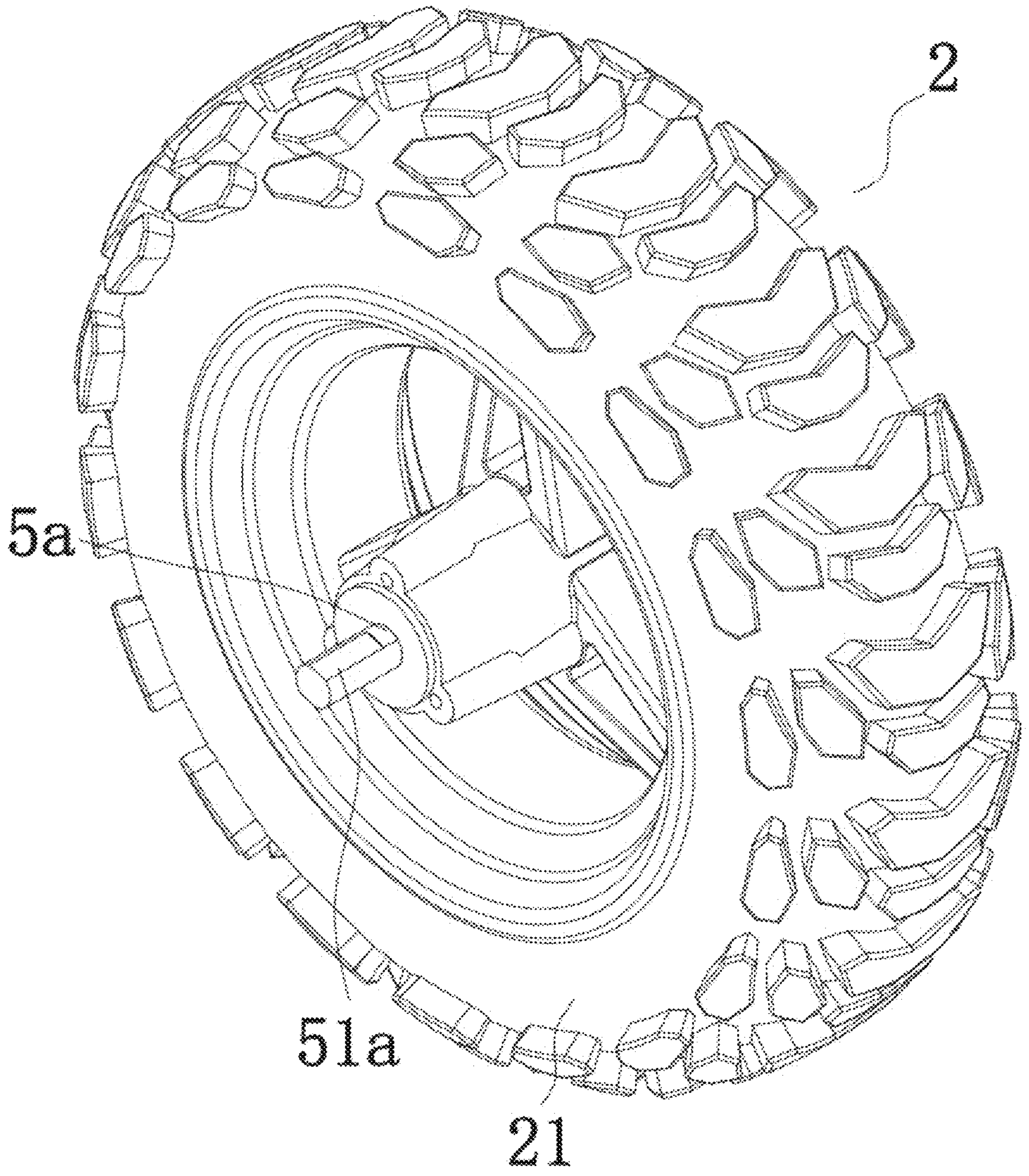
FIG. 4 is a schematic structural view of the driven wheel.
Figure 11:
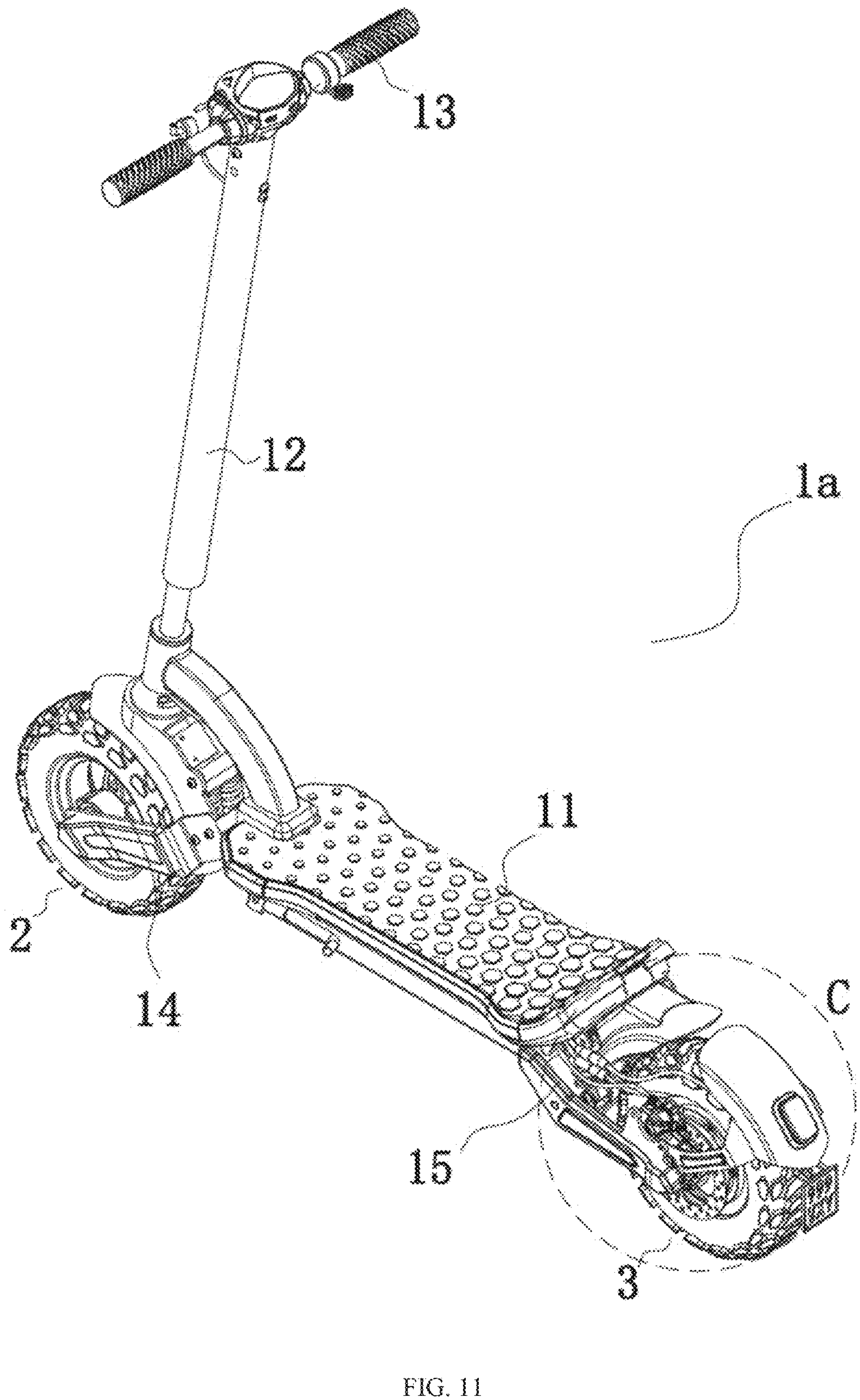
FIG. 11 is a schematic structural view of the scooter (with the driven wheel and the driving wheel), viewed from another perspective.

Referring to FIG. 1 and FIG. 11, two front mounting plates 14 are mounted on left and right sides of the bottom of the front portion of the scooter body 11 respectively, and the two front mounting plates 14 are arranged in bilateral symmetry below the steering stem 12 and are able to rotate around the axis of the steering stem 12 together with the steering stem 12. Front mounting grooves 141 (see FIG. 3) penetrating through plate walls of the front mounting plates 14 in a left-right direction are formed in front portions of the front mounting plates 14, and openings of the front mounting grooves 141 extend to front surfaces of the front mounting plates 14. Referring to FIG. 4, the driven wheel 2 comprises a driven outer wheel 21 to be in contact with the ground, a front mounting block 5*a* which is able to rotate with respect to the driven outer wheel 21 is horizontally arranged at the center of the driven outer wheel 21 in the left-right direction, front shafts 51*a* extending leftward and rightward are arranged at left and right ends of the front mounting block 5*a* respectively (the front shaft 51*a* at the left end is hidden), and external threads are arranged at tail ends of the front shafts 51*a*. In order to mount the driven wheel 2 at the bottom of the front portion of the scooter body 11 (see FIG. 2), users first need to place the driven wheel 2 between the left and right front mounting plates 14, and then clamp the left and right front shafts 51*a* of the front mounting block 5*a* of the driven wheel 2 into the corresponding front mounting grooves 141 via the openings of the left and right front mounting grooves 141 (see FIG. 3) respectively, then the left and right front shafts 51*a* are mounted along the corresponding front mounting grooves 141 until they reach the bottoms of the front mounting grooves 141, the left and right front shafts 51*a* clamped in the front mounting grooves 141 penetrate through the left and right front mounting grooves 141 to extend out of the left and right front mounting plates 14, two nuts (not shown) may be respectively mounted on the external threads at the tail ends of the left and right front shafts 51 and tightened, and the two nuts draw close to each other until they press against side walls of the left and right front mounting plates

14 respectively to produce sufficient friction. In this way, the driven wheel 2 is detachably mounted on the left and right front mounting plates 14, and the driven outer wheel 21 of the driven wheel 2 can rotate around the front mounting block 5*a*.

Figure 5:
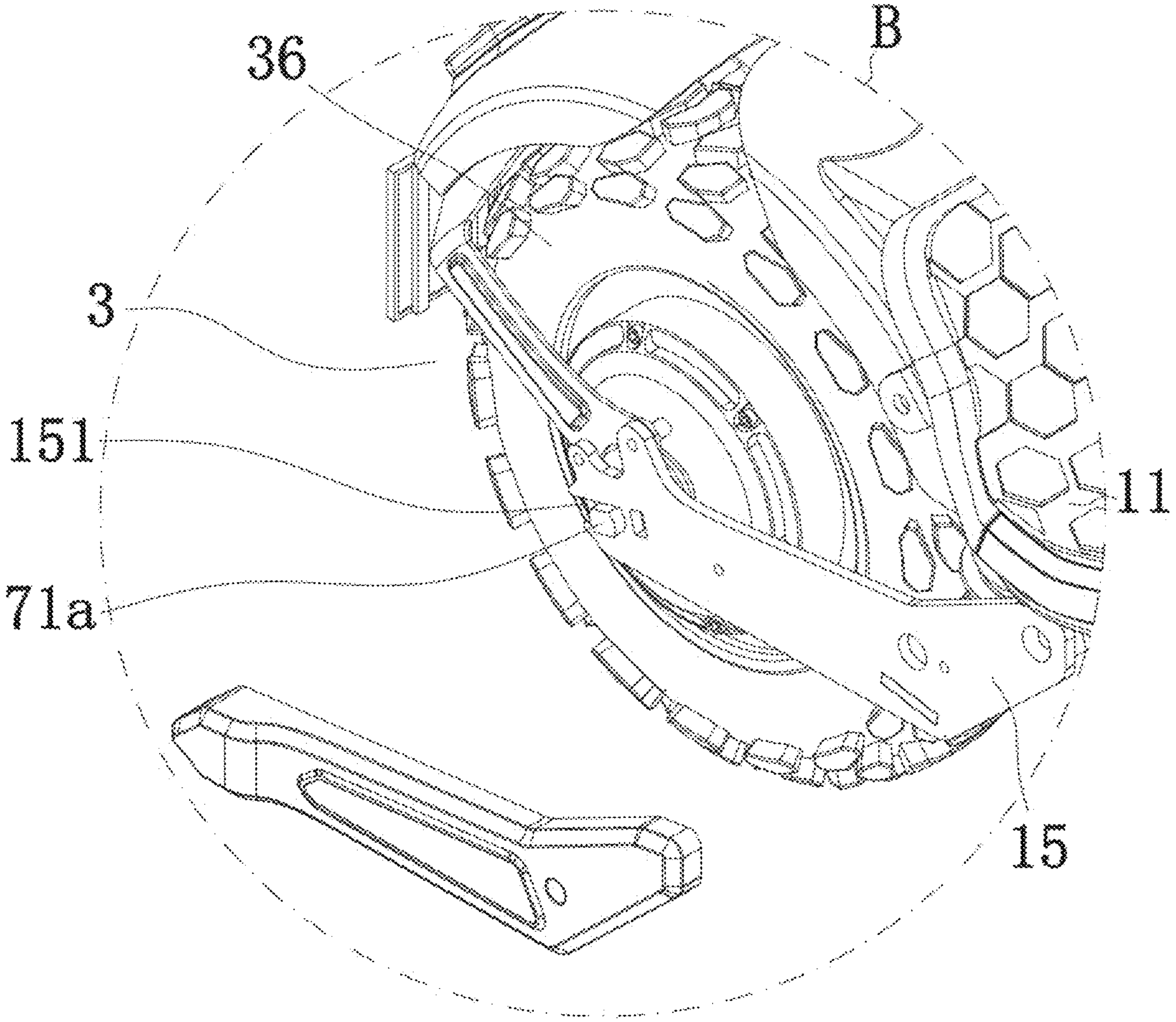
FIG. 5 is an enlarged view of portion B in FIG. 2.
Figure 6:
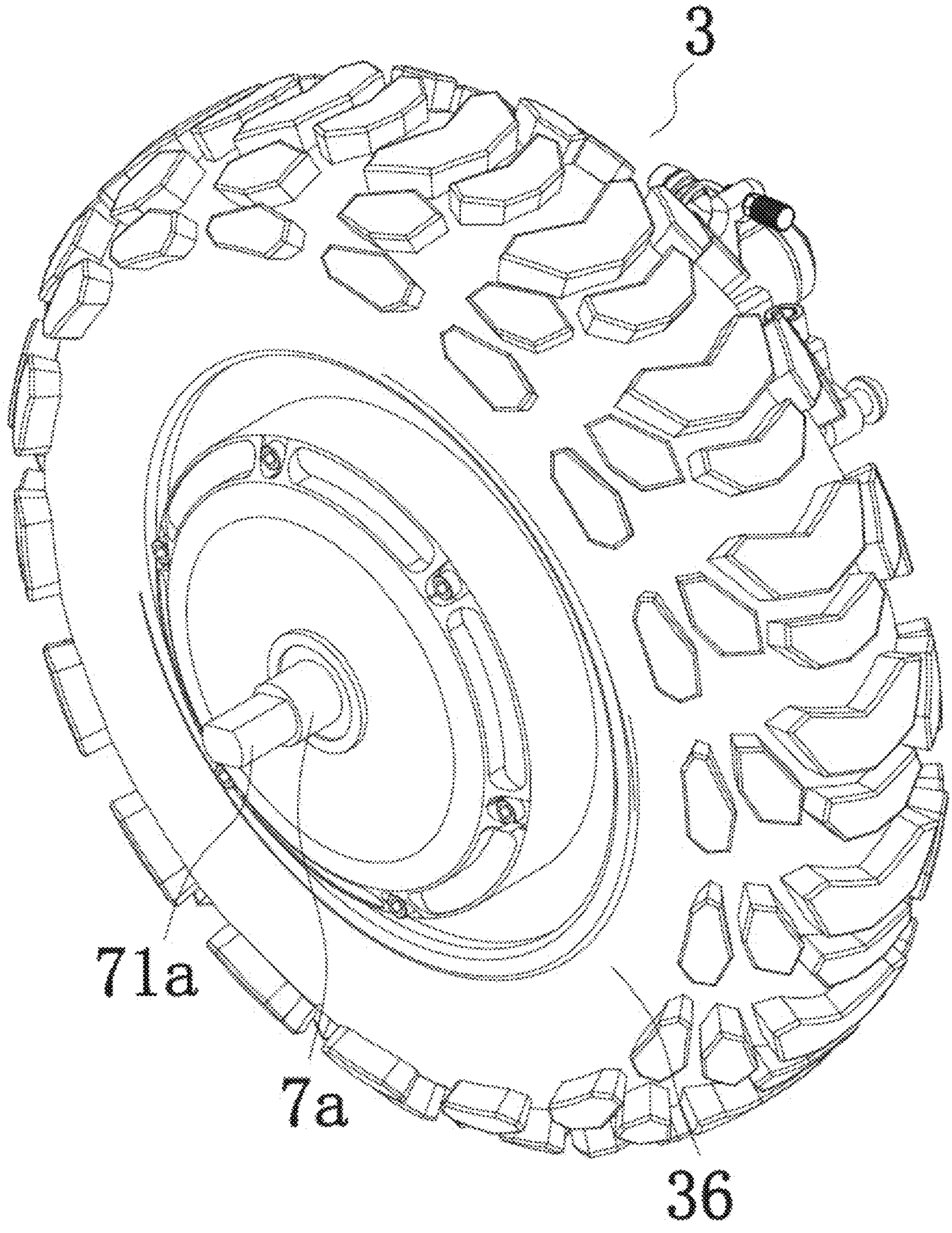
FIG. 6 is a schematic structural view of the driving wheel.

Referring to FIG. 1 and FIG. 11, two rear mounting plates 15 are mounted on left and right sides of the bottom of a rear portion of the scooter body 11 respectively, and the two rear mounting plates 15 extend backward and are arranged in bilateral symmetry. Rear mounting grooves 151 (see FIG. 5) penetrating through plate walls of the rear mounting plates 15 in the left-right direction are formed in rear portions of the rear mounting plates 15, and openings of the rear mounting grooves 151 extend to rear surfaces of the rear mounting plates 15. Referring to FIG. 6, a driving motor 31 (see FIG. 12) is arranged in the driving wheel 3, the driving wheel 3 comprises a driving outer wheel 36 which is in contact with the ground and is driven by the driving motor 31 to rotate, a rear mounting block 7*a* which is able to rotate with respect to the driving outer wheel 36 is horizontally arranged at the center of the driving outer wheel 36 in the left-right direction, rear shafts 71*a* which extend leftward and rightward are arranged at left and right ends of the rear mounting block 7*a* respectively (the rear shaft 71*a* at the left end is hidden), and external threads are arranged at tail ends of the rear shafts 71*a*. The driven wheel 3 is mounted on the scooter body 11 (see FIG. 5) in a similar way to the driven wheel 2 except that the driving wheel 3 is clamped and mounted at the bottoms of the rear mounting grooves 151 of the rear mounting plates 15 from back to front by means of the left and right rear shafts 71*a*, and is then tightened with another two nuts (not shown) to be detachably mounted at the bottom of the rear portion of the scooter body 11. Details will not be repeated here.

Figure 12:
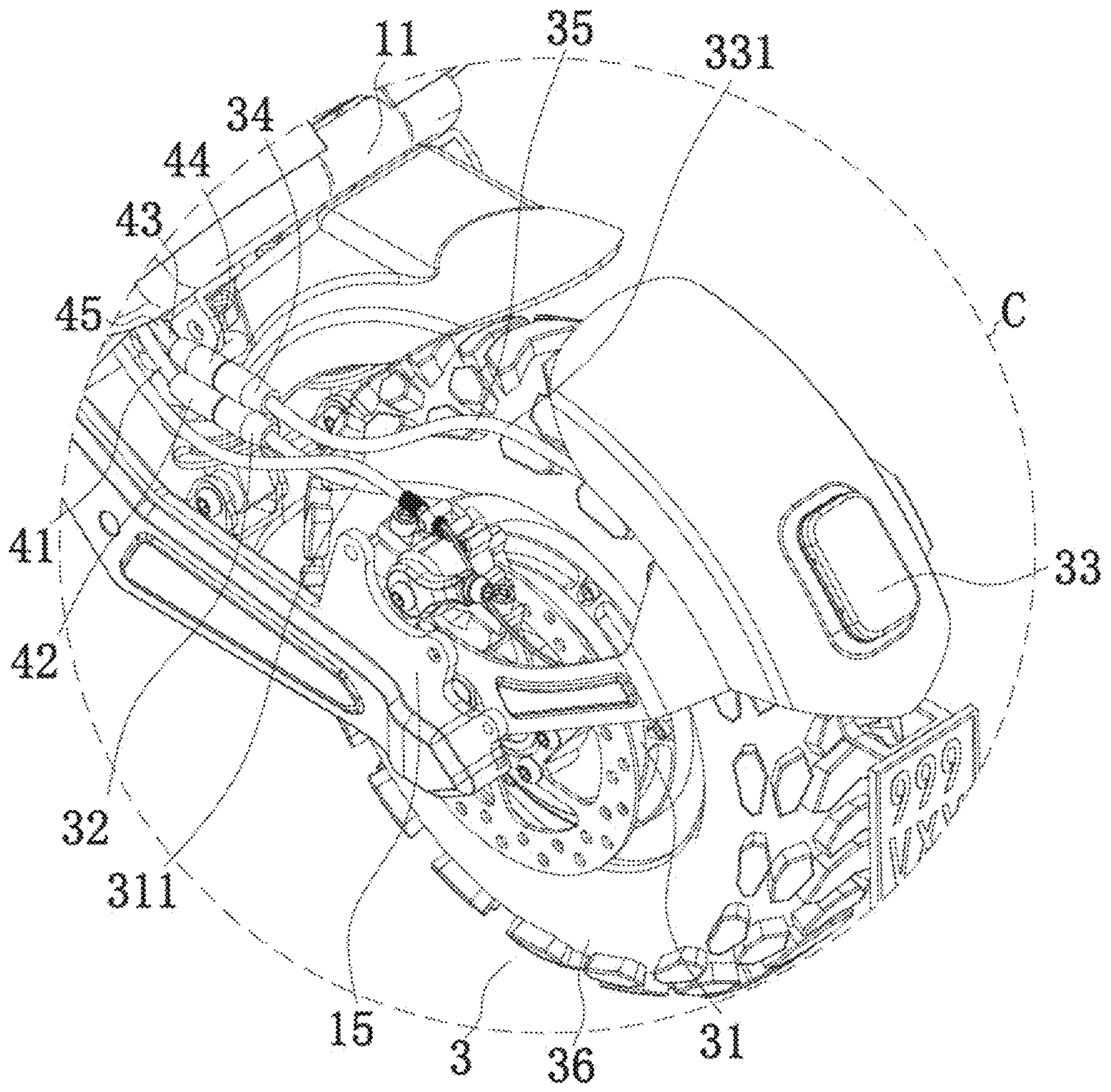
FIG. 12 is an enlarged view of portion C in FIG. 11.

After the driving wheel 3 is mounted between the two rear mounting plates 15, the driving motor 31 of the driving wheel 3 needs to be electrically connected to the controller on the scooter body 11 to ensure that the power supply can supply power to the driving motor 31 through the controller. For this purpose, as shown in FIG. 12, the driving motor 31 is provided with a motor butting line 311, and a first male butt joint 32 is arranged at a start end, extending forward, of the motor butting line 311; and the controller is connected with a motor connecting line 41, and a first female butt joint 42 is arranged at a tail end, extending backward out of the scooter body 11, of the motor connecting line 41. Users can join together the first male butt joint 32 and the first female butt joint 42 to connect the motor butting line 311 and the motor connecting line 41, so as to electrically connect the controller to the driving motor 31, such that the controller can control the power supply to supply power to the driving motor 31, and after being powered on to be started, the driving motor 31 can drive the driving outer wheel 36 to rotate around its axis with respect to the scooter body 11 to drive the scooter 1*a* to move forward.

A driving wheel taillight 33 is mounted above the driving wheel 3. The driving wheel taillight 33 also needs to be electrically connected to the controller to be controlled by the controller. For this purpose, the driving wheel taillight 33 is provided with a taillight butting line 331, and a second male butt joint 34 is arranged at a start end, extending forward, of the taillight butting line 331; and the controller is connected with a taillight connecting line 43, and a second female butt joint 44 is arranged at a tail end, extending backward out of the scooter body 11, of the taillight connecting line 43. Users can join together the second male butt joint 34 and the second female butt joint 44 to connect the taillight butting line 331 and the taillight connecting line 43, so as to electrically connect the controller to the driving wheel taillight 33, such that when the scooter 1*a* is braked, the controller can control the power supply to supply power to the driving wheel taillight 33, and the driving wheel taillight 33 is turned on to emit light to give a warning to vehicles behind.

To ensure that the controller can recognize the driving wheel 3 mounted at the bottom of the rear portion of the scooter body 11 and can execute a corresponding preset program, the controller is connected with a pattern recognition line 45, the pattern recognition line 45 and the taillight connecting line 43 are integrated, and tail ends of the pattern recognition line 45 and the taillight connecting line 43 share the second female butt joint 44. The driving wheel taillight 33 is correspondingly provided with a pattern butting line 35, the pattern butting line 35 and the taillight butting line 331 are integrated, and start ends of the pattern butting line 35 and the taillight butting line 331 share the second male butt joint 34. Users can join together the second male butt joint 34 and the second female butt joint 44 to connect the pattern recognition line 45 and the pattern butting line 35, such that the controller can recognize the pattern butting line 35 of the driving wheel 3 by means of the pattern recognition line 45 to recognize the driving wheel 3 mounted at the bottom of the rear portion of the scooter body 11.

Figure 15:
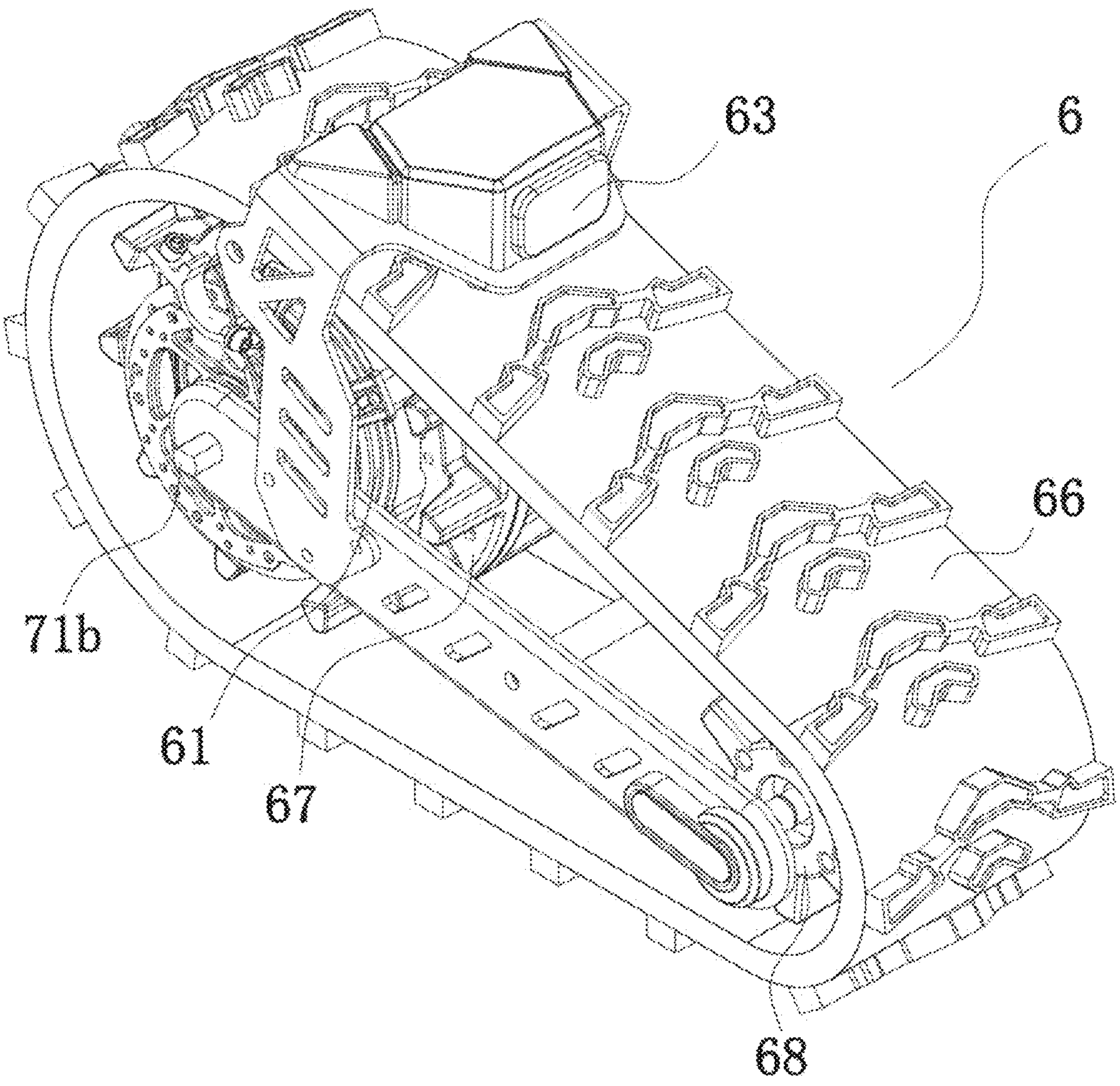
FIG. 15 is a schematic structural view of the driving caterpillar track in FIG. 13.
Figure 16:
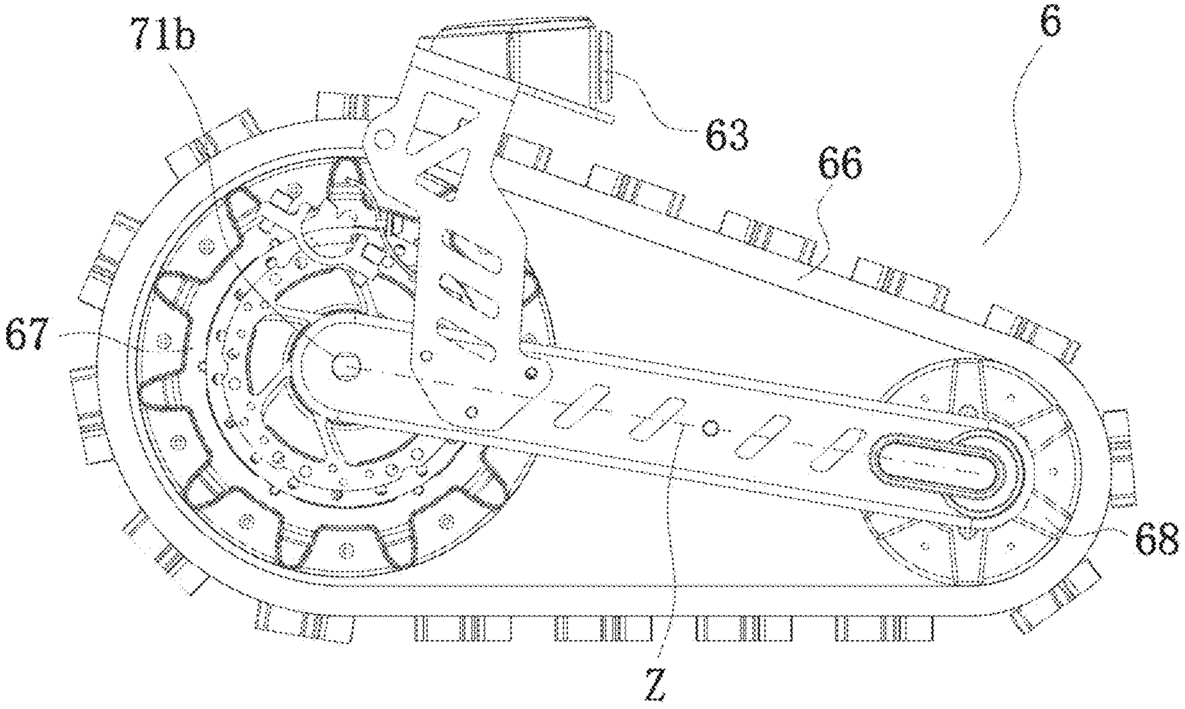
FIG. 16 is a left view of the driving caterpillar track in FIG. 15.

After the driven wheel 2 and the driving wheel 3 are mounted, the scooter 1 a shown in FIG. 1 is obtained. Users can stand on the top surface of the scooter body 11 of the scooter 1*a* and hold the handlebar 13 to control the scooter 1*a* so as to drive the scooter 1*a* on flat roads. In a case where users drive the scooter on roads with a little mud or shallow snow, the users can detach the driving wheel 3 from the scooter 1*a* and mount a driving caterpillar track 6 shown in FIG. 7 (or FIG. 15). The driving caterpillar track 6 comprises a circular caterpillar track body 66, and as shown in FIG. 15 and FIG. 16, a front driving pulley 67 and a rear driven pulley 68 are arranged in the caterpillar track body 66. The driving pulley 67 has a diameter of 219 mm, the driven pulley 68 has a diameter of 113.5 mm, the ratio of the diameter of the driving pulley 67 to the diameter of the driven pulley 68 is 1.93, and an axial distance Z is 314.5 mm. A driving motor 6 is arranged in the front driving pulley 67 and drives the driving pulley 67 to rotate around a horizontal axis to drive the caterpillar track body 66 to move forward and backward; and a rear mounting block 7*b* is arranged at the center of the driving pulley 67 and is identical in structure to the rear mounting block 7*a* of the driving wheel 3 (see FIG. 6), and rear shafts 71*b* extend from the rear mounting block 7*b* of the driving caterpillar track 6. In order to detach the driving wheel 3 from the scooter 1*a* and mount the driving caterpillar track 6, users first need to separate the two pairs of male butt joints 32 and 34 and female butt joints 42 and 44 which are joined together, then unscrew the two nuts, pressing against the left and right rear mounting plates 15, on the driving wheel 3 (see FIG. 5), and then pull the rear shafts 71*a* at the two ends of the rear mounting block 7*a* of the driving wheel 3 out of the rear mounting grooves 151 to detach the driving wheel 3 from the scooter 1*a*; next, like mounting the driving wheel 3, the left and right rear shafts 71*b* of the rear mounting block 7*b* of the driving caterpillar track 6 are clamped and mounted at the bottoms of the rear mounting grooves 151 of the rear mounting plates 15, and the two nuts which are previously used for the driving wheel 3 are mounted on the external threads at the tail ends of the left and right rear shafts 71*b* of the driving caterpillar track 6 respectively and tightened, the two nuts draw close to each other and press against side walls of the left and right rear mounting plates 15 respectively to produce sufficient friction. In this way, the driving caterpillar track 6 is detachably mounted on the left and right rear mounting plates 15.

Figure 8:
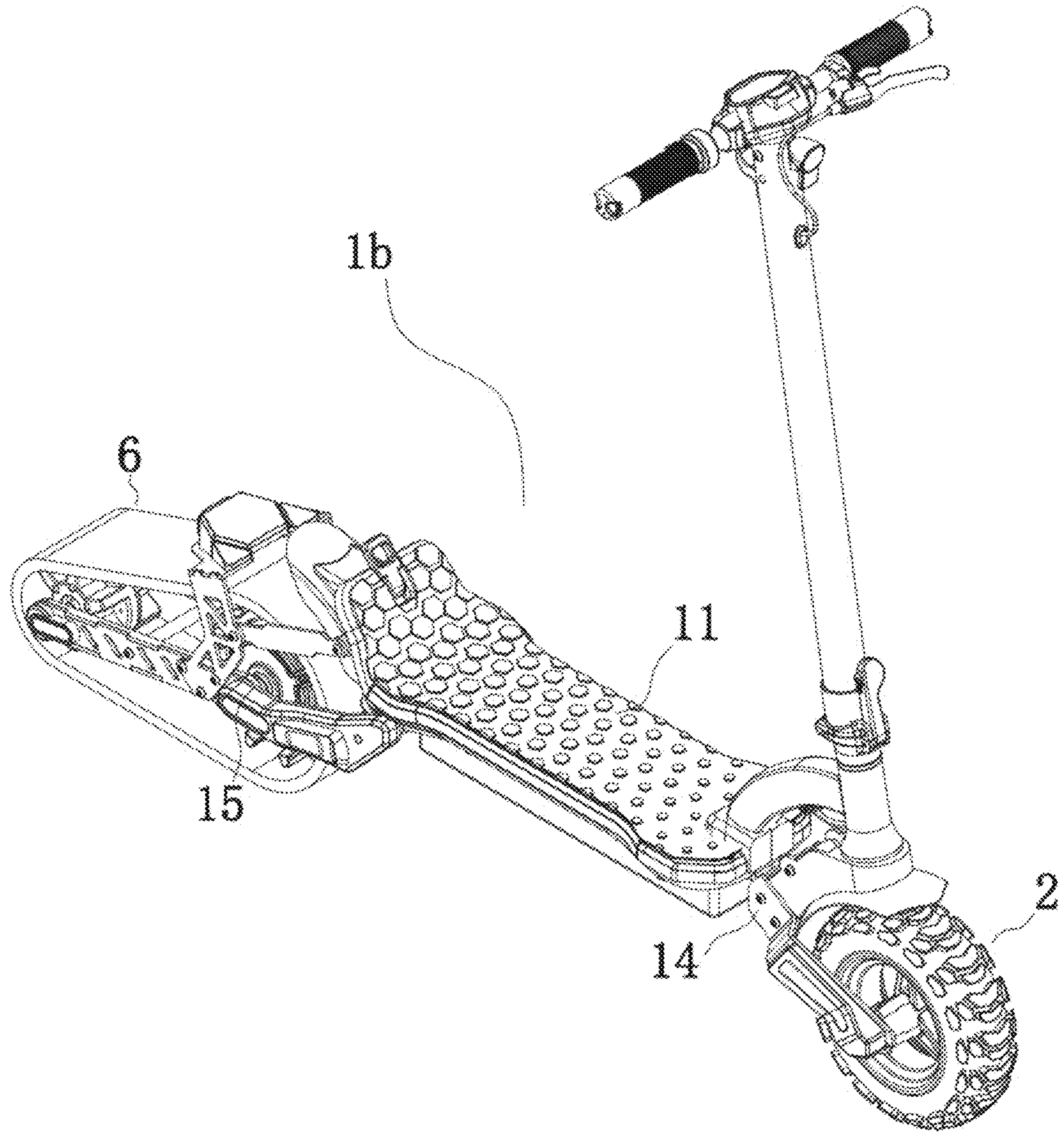
FIG. 8 is a schematic structural view of a scooter (with the driven wheel and the driving caterpillar track).
Figure 14:
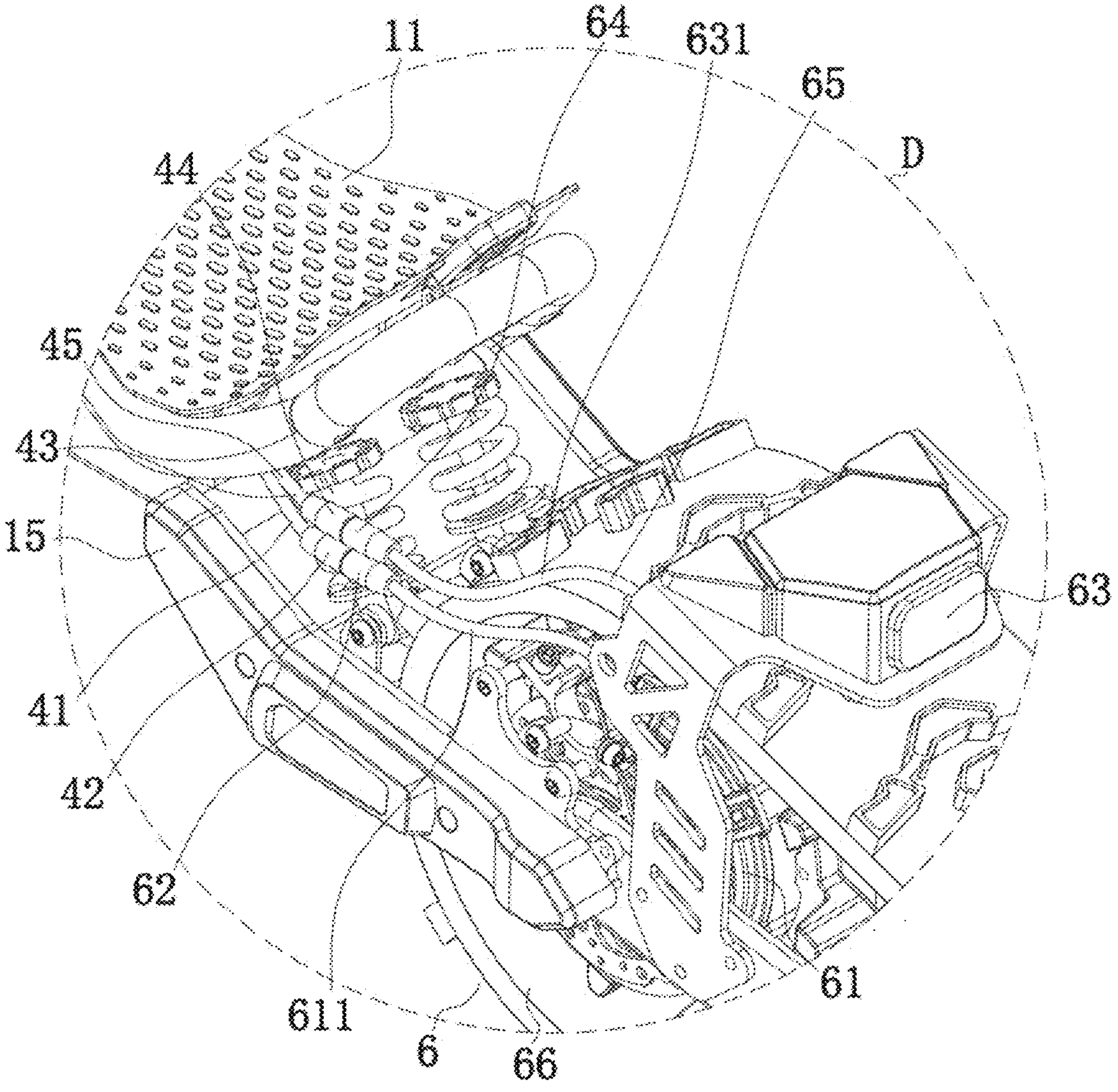
FIG. 14 is an enlarged view of portion D in FIG. 13.

Referring to FIG. 14, a caterpillar track taillight 63 is arranged above the driving caterpillar track 6. After the driving caterpillar track 6 is mounted between the two rear mounting plates 15, the driving motor 61 of the driving caterpillar track 6 and the caterpillar track taillight 63 need to be electrically connected to the controller. For this purpose, the driving caterpillar track 6 is provided with a motor butting line 611, a first male butt joint 62, a taillight butting line 631, a second male butt joint 64 and a pattern butting line 65, wherein the taillight butting line 631 and the pattern butting line 65 are integrated, and start ends of the taillight butting line 631 and the pattern butting line 65 share the second male butt joint 64. In this way, after mounting the driving caterpillar track 6 between the two rear mounting plates 15, users can join together the first male butt joint 62 and the first female butt joint 42 and join together the second male butt joint 64 and the second female butt joint 44 to electrically connect the controller to the driving motor 61 of the driving caterpillar track 6 and the caterpillar track taillight 63 respectively, such that the controller can recognize the pattern butting line 65 of the driving caterpillar track 6 by means of the pattern recognition line 45 to recognize the driving caterpillar track 6 mounted at the bottom of the rear portion of the scooter body 11. After installation and line connection of the driving caterpillar track 6 are completed, the scooter 1*b* shown in FIG. 8 is obtained, and the caterpillar track body 66 of the driving caterpillar track 6 can rotate around the rear mounting block 7*b* (see FIG. 7) to drive the scooter 1*b* to move forward. Since the scooter 1*b* is driven by the driving caterpillar track 6 and the contact area between the driving caterpillar track 6 and the ground is greater than the contact area between the driving wheel 3 and the ground, the scooter 1*b* is unlikely to slip.

The diameter of the driving pulley 67 and the diameter of the driven pulley 68 of the driving caterpillar track 6 have influence on the adaptability of the driving caterpillar track 6 mounted on the scooter, thus affecting the driving experience of drivers. The difference in comfort brought about by mounting the driving caterpillar track 6 with different parameters on the scooter is tested and the test results are shown in the table below:

| Serial number | Diameter of the driving pulley 67 | Diameter of the driven pulley 68 | Ratio of the diameter of the driving pulley 67 to the diameter of the driven pulley 68 | Axial distance Z | Comfort score |
|---|---|---|---|---|---|
| 1 | 200 | 200 | 1 | 314.5 | 6.2 |
| 2 | 260 | 260 | 1 | 314.5 | 6.4 |
| 3 | 150 | 150 | 1 | 314.5 | 5.9 |
| 4 | 100 | 100 | 1 | 314.5 | 5.7 |
| 5 | 100 | 200 | 0.5 | 314.5 | 6.0 |
| 6 | 200 | 100 | 2 | 314.5 | 8.2 |
| 7 | 260 | 150 | 1.73 | 314.5 | 8.0 |
| 8 | 210 | 140 | 1.5 | 314.5 | 7.8 |
| 9 | 250 | 100 | 2.5 | 314.5 | 7.5 |
| 10 | 219 | 113.5 | 1.93 | 314.5 | 8.5 |
| 11 | 219 | 113.5 | 1.93 | 300 | 8.2 |
| 12 | 219 | 113.5 | 1.93 | 350 | 8.0 |
| 13 | 219 | 113.5 | 1.93 | 250 | 7.3 |
| 14 | 219 | 113.5 | 1.93 | 400 | 7.0 |

Note: The parameters of the driving caterpillar track in this embodiment correspond to the first ten groups of data in the table; and the unit of the diameter is mm, the perfect comfort score is 10, and the comfort score is a mean value of scores given by an evaluation team with ten evaluators. All the parameters of the tested driving caterpillar tracks 6, other than the parameters in the above table, are the same.

As can be known from the first to fifth groups of data in the above table, if the diameter of the driving pulley 67 is less than or equal to that of the driven pulley 68 (that is, the ratio of the diameter of the driving pulley 67 to the diameter of the driven pulley 68 is less than or equal to 1), the comfort brought about by the driving caterpillar track is moderate (the score is about 6.0).

As can be known the sixth to tenth groups of data in the above table, if the diameter of the driving pulley 67 is greater than or equal to that of the driven pulley 68 (that is, the ratio of the diameter of the driving pulley 67 to the diameter of the driven pulley 68 is greater 1), the comfort brought about by the driving caterpillar track is good (the score is higher than 7.5) and the comfort in the tenth group of data is the best.

As can be known from the eleventh to fourteenth groups of data in the above table, under the condition where the ratio of the diameter of the driving pulley 67 to the diameter of the driven pulley 68 is constant), the comfort brought about by the driving caterpillar track is good (the score is higher than 8.0) when the axial distance Z is 300 mm-350 mm.

To sum up, in this embodiment, the driving pulley 67 of the driving caterpillar track 6 is located in front of the driven pulley 68, and the diameter of the driven pulley 68 is less than that of the driving pulley 67. Upon experimental verification, the driving caterpillar track 6 of such a structure can better adapt to the scooter 1*b* when mounted on the scooter 1*b*, and users can drive the scooter comfortably. In this embodiment, the diameter of the driven pulley 68 of the driving caterpillar track 6 is 113.5 mm, the diameter of the driving pulley 67 is 219 mm, the ratio of the diameter of the driving pulley 67 to the diameter of the driven pulley 68 is 1.93, and the axial distance Z is 314.5 mm. In other embodiments, the diameter of the driven pulley 68 may be 100 mm-150 mm, the diameter of the driving pulley 67 may be 200 mm-260 mm, the ratio of the diameter of the driving pulley 67 to the diameter of the driven pulley 68 may be 1.5-2.5, and the axial distance Z may be 300 mm-350 mm.

When the parameters of the driving caterpillar track 6 are set within the corresponding ranges, drivers can drive the scooter comfortably.

Figure 13:
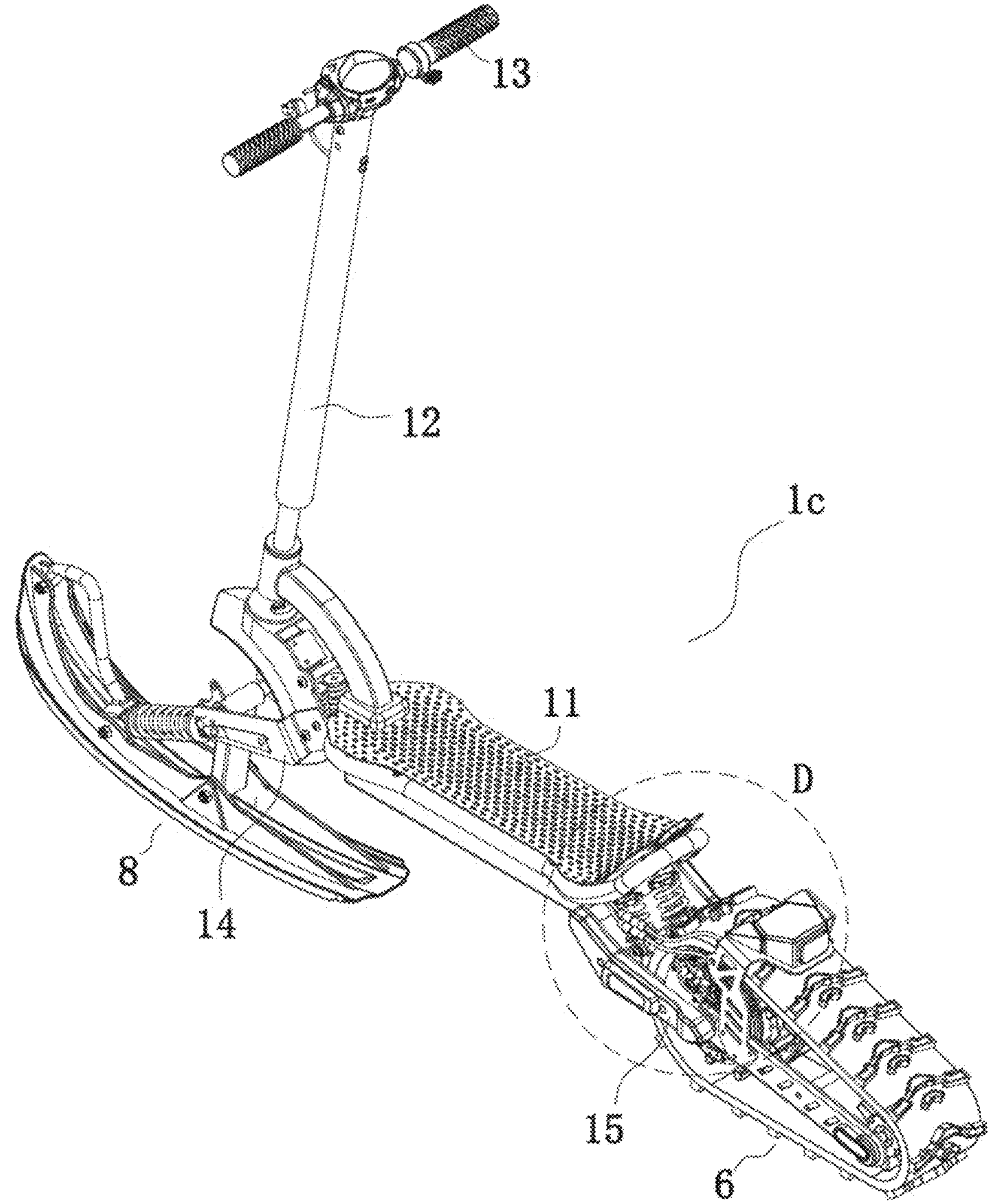
FIG. 13 is a schematic structural view of the scooter (with the landing board and the driving caterpillar track), viewed from another perspective.

In a case where users drive the scooter 1*b* on a road with much mud or deep snow, the driven wheel 2 of the scooter 1*b* will easily get stuck in sand or snow, affecting normal driving. In view of this, users may detach the driven wheel 2 from the scooter 1*b* and mount a landing board 8 shown in FIG. 9. The landing board 8 comprises a long plate-like body 81, a front mounting block 5*b* is arranged on an upper portion of the landing board 8 and is identical in structure with the front mounting block 5*a* of the driven wheel 2 (in conjunction with FIG. 4), front shafts 51*b* extend from the front mounting block 5*b* of the landing board 8, and the body 81 of the landing board 8 is able to rotate around the front mounting block 5*b*. In order to replace the driven wheel 2 with the landing board 8, users first need to unscrew the two nuts 14, pressing against the left and right front mounting plates 14, on the driven wheel 2 (see FIG. 3) and then pull the front shafts 51*a* at the two ends of the front mounting block 5*a* of the driven wheel 2 from the front mounting grooves 141 to detach the driven wheel 2 from the scooter 1*b*; next, like mounting the driven wheel 2, the landing board 8 is detachably mounted on the left and right front mounting plates 14. After the landing board 8 is mounted, the scooter 1*c* shown in FIG. 10 or FIG. 13 is obtained, and since the contact area between the long plate-like body 81 of the landing board 8 and the ground is greater than the contact area between the driven wheel 2 and the ground, the scooter 1*c* hardly get stuck in sand or snow.

In this embodiment, the two front mounting plates 14 are mounted on the left and right sides of the bottom of the front portion of the scooter body 11 respectively to serve as a front mounting structure of the scooter body 11, and users select either the driven wheel 2 or the landing board 8 as a front landing member and detachably mount the front landing member on the front mounting structure; and the two rear mounting plates 15 are mounted on the left and right sides of the rear portion of the scooter body 11 respectively to serve as a rear mounting structure of the scooter body 11, and users select either the driving wheel 3 or the driving caterpillar track 6 as a rear landing member and detachably mount the rear landing member on the rear mounting structure. In other embodiments, each front landing member may comprise two front mounting plates 14, and is clamped in the front mounting grooves 141 of the two front mounting plates 14 by means of the front shafts 51*a* and 51*b* respectively and tightened with nuts; and correspondingly, the two front mounting plates 14 will not be mounted at the bottom of the front portion of the scooter body 11 anymore, and after determining the front landing member to be used, users can detachably mount the front landing member on the scooter body 11 just by mounting the two front mounting plates 14 of the front landing member at the bottom of the front portion of the scooter body 11. Similarly, the rear landing member and the rear mounting structure may be modified in the same way, which will not be repeated here. In addition, in other embodiments, the rear landing member is not limited to these two mentioned above and, for example, may include multiple driving caterpillar tracks 6 of different sizes to adapt to more complex road conditions. It should be noted that two driving caterpillar tracks 6 of different sizes may be rear landing members of the same type or rear landing members of different types. For example, the two driving caterpillar tracks 6 of different sizes have no significant difference and can be controlled by the controller according to the same preset program, and in this case, the two driving caterpillar tracks 6 of different sizes are rear landing members of the same type and may be provided with identical pattern butting lines 65 to be connected to the pattern recognition line 45 so as to be recognized by the controller. For another example, the two driving caterpillar tracks 6 of different sizes are greatly different from each other and cannot be controlled by the controller according to the same preset program, and in this case, the two driving caterpillar tracks 6 are rear landing members of different types and need to be provided with different pattern butting lines.

In this embodiment, the driving wheel 3 and the driving caterpillar track 6, as two rear landing members of different types, are provided with different pattern butting lines 35 and 65 which have different resistances, so after the pattern butting lines 35 and 65 are joined to the pattern recognition line 45, the controller receives different voltages, and the type of the rear landing member mounted on the rear mounting structure can be recognized according to different voltages. In other embodiments, one of the two rear landing members is provided with the pattern butting line 35 or 65, and the other one of the two rear landing members is not provided with the pattern butting line 35 or 65. For example, the driving wheel 3 is not provided with the pattern butting line 35, and the driving caterpillar track 6 is still provided with the pattern butting line 65, so after the driving motor 3 is mounted on the rear mounting structure, the controller will not receive a signal from the pattern butting line 35, and the driving wheel 3 will be controlled to operate according to a first preset program; and after the driving caterpillar track 6 is mounted on the rear mounting structure, the pattern butting line 65 of the driving caterpillar track 6 will be joined to the pattern recognition line 45 to be recognized by the controller, and the controller will control the driving caterpillar track 6 to operate according to a second preset program. In other embodiments where more than two types of rear landing members are used, these rear landing members of different types may be provided with different pattern butting lines, like in this embodiment; or, one of these rear landing members is not provided with the pattern butting line, and the other rear landing members are provided with different pattern butting lines respectively.

In this embodiment, rear landing members of different types are provided with different pattern butting lines 35 and 65, and the pattern butting lines 35 and 65 and the pattern recognition line 45 function as a recognizer which allows the controller to recognize the type of the rear landing member mounted on the rear mounting structure. In other embodiments, the recognizer may be in other forms. For example, the recognizer may be a laser receiver arranged on the rear portion of the scooter body 11 and electrically connected to the controller, each rear landing member is provided with a laser emitter, the laser emitters emit different laser lights, and after any one rear landing member is mounted on the rear mounting structure, the laser emitter of the rear landing member will emit a laser light to the laser receiver, and the controller recognizes the rear landing member corresponding to the laser light according to the laser light received by the laser receiver.

In addition, referring to FIG. 12 and FIG. 14, in this embodiment, the pattern recognition line 45 of the controller and the taillight connecting line 43 are integrated and share the second female butt joint 44, the pattern butting line 35 or 65 of the rear landing member and the taillight butting line 331 or 631 are integrated and share the second male butt joint 34 or 64. In other embodiments, the pattern recognition line 45 of the controller may be integrated with the motor connecting line 41, and the pattern recognition line 45 and the motor connecting line 41 are provided with first female butt joints 42 respectively; and the pattern butting line 35 or 65 of the rear landing member is integrated with the motor butting line 311 or 611, and the pattern butting line 35 or 65 and the motor butting line 311 or 611 are provided with first male butt joints 32 and 62 respectively.

The above description is merely for explaining some embodiments of the invention, and is not intended to limit the patent protection scope of the invention. All non-substantive variations or substitutions made by those skilled in the art based on the invention should also fall within the patent protection scope of the invention.

What is claimed is:

1. An electric scooter, comprising a scooter body, the scooter body having a top surface allowing a driver to stand thereon, and a handlebar being arranged on a front portion of the scooter body, wherein a rear mounting structure is arranged at a bottom of a rear portion of the scooter body, which allows a user to select either one of two rear members, which are a driving wheel and a driving caterpillar track, as a rear landing member to be detachably mounted on the rear mounting structure; and wherein the electric scooter is provided with a recognizer capable of recognizing a type of the rear landing member mounted on the rear mounting structure, and comprises a controller configured to control the rear landing member and connected to the recognizer.

2. The electric scooter according to claim 1, wherein a front mounting structure is arranged at a bottom of the front portion of the scooter body, which allows the user to select either one of two front members, which are a driven wheel and a landing board, as a front landing member to be detachably mounted on the front mounting structure.

3. The electric scooter according to claim 2, wherein the front mounting structure comprises front mounting plates extending forward from the front portion of the scooter body, and front mounting grooves are formed in the front mounting plates to allow the front landing member to be clamped and mounted therein; and the rear mounting structure comprises rear mounting plates extending backward from the rear portion of the scooter body, and rear mounting grooves are formed in the rear mounting plates to allow the rear landing member to be clamped and mounted therein.

4. The electric scooter according to claim 3, wherein the electric scooter comprises the driving wheel and/or the driving caterpillar track, the two rear members are provided with rear mounting blocks and are able to rotate around the corresponding rear mounting blocks, and each said rear member is clamped into the rear mounting grooves by means of the rear mounting block.

5. The electric scooter according to claim 4, wherein the driving caterpillar track comprises a circular caterpillar track body, a front driving pulley and a rear driven pulley are arranged in the caterpillar track body, and a diameter of the driven pulley is less than that of the driving pulley.

6. The electric scooter according to claim 5, wherein the diameter of the driving pulley is 200 mm-260 mm, and/or the diameter of the driven pulley is 100 mm-150 mm;

and a ratio of the diameter of the driving pulley to the diameter of the driven pulley is 1.5-2.5, and an axial distance is 300 mm-350 mm.

7. The electric scooter according to claim 1, wherein the recognizer comprises a pattern recognition line, at least one said rear member is provided with a pattern butting line capable of reflecting the type of said rear member, and after said rear member provided with the pattern butting line is mounted on the rear mounting structure, the pattern butting line is connected to the pattern recognition line.

8. The electric scooter according to claim 7, wherein the two rear members are both provided with pattern butting lines reflecting the type of the rear members.

9. The electric scooter according to claim 8, wherein the two rear members are provided with taillights, the taillights are provided with taillight butting lines to be connected to the controller, and the taillight butting lines are integrated with the pattern butting line; the controller is connected with a taillight connecting line, and the taillight connecting line is integrated with the pattern recognition line; start ends of the taillight butting lines and the pattern butting line which are integrated together share a same butt joint, and tail ends of the taillight connecting line and the pattern recognition line which are integrated together share a butt joint, and after the rear members are mounted on the rear mounting structure, the two butt joints are joined together to connect the taillight butting lines to the taillight connecting line and connect the pattern butting line to the pattern recognition line;

and/or the two rear members are provided with driving motors, the driving motors are provided with motor butting lines to be connected to the controller, and the motor butting lines are integrated with the pattern butting line; the controller is connected with a motor connecting line, and the motor connecting line is integrated with the pattern recognition line; start ends of the motor butting lines and the pattern butting line which are integrated together share a same butt joint, and tail ends of the motor connecting line and the pattern recognition line which are integrated together share a butt joint, and after the rear members are mounted on the rear mounting structure, the two butt joints are joined together to connect the motor butting lines to the motor connecting line and connect the pattern butting line to the pattern recognition line.

* * * * *